United States Patent [19]
Youngner

[11] Patent Number: 5,211,816
[45] Date of Patent: May 18, 1993

[54] VACUUM DISTILLATION APPARATUS FOR REMOVAL OF VOLATILE IMPURITIES FROM LIQUIDS

[75] Inventor: Daniel W. Youngner, Maple Grove, Minn.

[73] Assignee: Eco Pure, Inc., Maple Grove, Minn.

[21] Appl. No.: 774,031

[22] Filed: Oct. 7, 1991

Related U.S. Application Data

[63] Continuation of Ser. No. 655,297, Feb. 14, 1991, abandoned, which is a continuation of Ser. No. 532,951, Jun. 4, 1990, abandoned, which is a continuation of Ser. No. 416,960, Oct. 14, 1989, abandoned, which is a continuation of Ser. No. 295,059, Jan. 6, 1989, abandoned.

[51] Int. Cl.$^5$ ............................................... B01D 3/10
[52] U.S. Cl. .................................... 202/205; 202/200; 202/185.1; 202/202; 202/197; 203/4; 203/40; 203/94; 159/DIG. 16; 159/DIG. 40
[58] Field of Search .............. 202/200, 176, 202, 205, 202/197, 264, 269, 185.1; 203/40, 91, 4, 11, 98, 94, DIG. 4; 159/DIG. 16, DIG. 40; 55/36, 178, 183

[56] References Cited

U.S. PATENT DOCUMENTS

| | | | |
|---|---|---|---|
| 2,499,158 | 2/1950 | Perry | 202/205 |
| 3,318,784 | 5/1967 | Murphy | 203/11 |
| 3,334,027 | 8/1967 | Goeldner | 202/200 |
| 3,390,057 | 6/1968 | Day | 203/11 |
| 3,674,652 | 7/1972 | Brown | 202/205 |
| 3,725,206 | 4/1973 | Foley | 203/11 |
| 4,260,459 | 4/1981 | Kirschman | 202/200 |
| 4,269,664 | 5/1981 | Younger | 202/185.2 |
| 4,304,638 | 12/1981 | Smith | 202/202 |
| 4,444,623 | 4/1984 | Youngner | 202/205 |
| 4,525,243 | 6/1985 | Miller | 202/205 |
| 4,536,257 | 8/1985 | Atwell | 202/205 |
| 4,568,428 | 2/1986 | Rig et al. | 202/181 |
| 4,686,009 | 8/1987 | McCabe | 202/181 |
| 4,762,593 | 8/1988 | Youngner | 202/205 |
| 4,770,748 | 9/1988 | Cellini et al. | 202/205 |

FOREIGN PATENT DOCUMENTS 2553098  4/1985  France .................... 202/205

Primary Examiner—Virginia Manoharan
Attorney, Agent, or Firm—Lawrence M. Nawrocki

[57] ABSTRACT

A low temperature vacuum distillation apparatus. The distillation apparatus includes an evaporation section and a condensation section. Fluid flow throughout the system is assisted by an appropriate pump, and heat exchangers, one in each of the evaporation and condensation sections, are interconnected by employment of a heat pump.

The condensation section includes a condensation chamber downward from which bubble tubes extend into a collection chamber. Collection chamber is provided with a pump to effect transfer of distillate having volatile impurities entrained therein to a final collection vessel. A pump communicates with vessel to create a partial vacuum therein to ensure venting of the impurities.

8 Claims, 1 Drawing Sheet

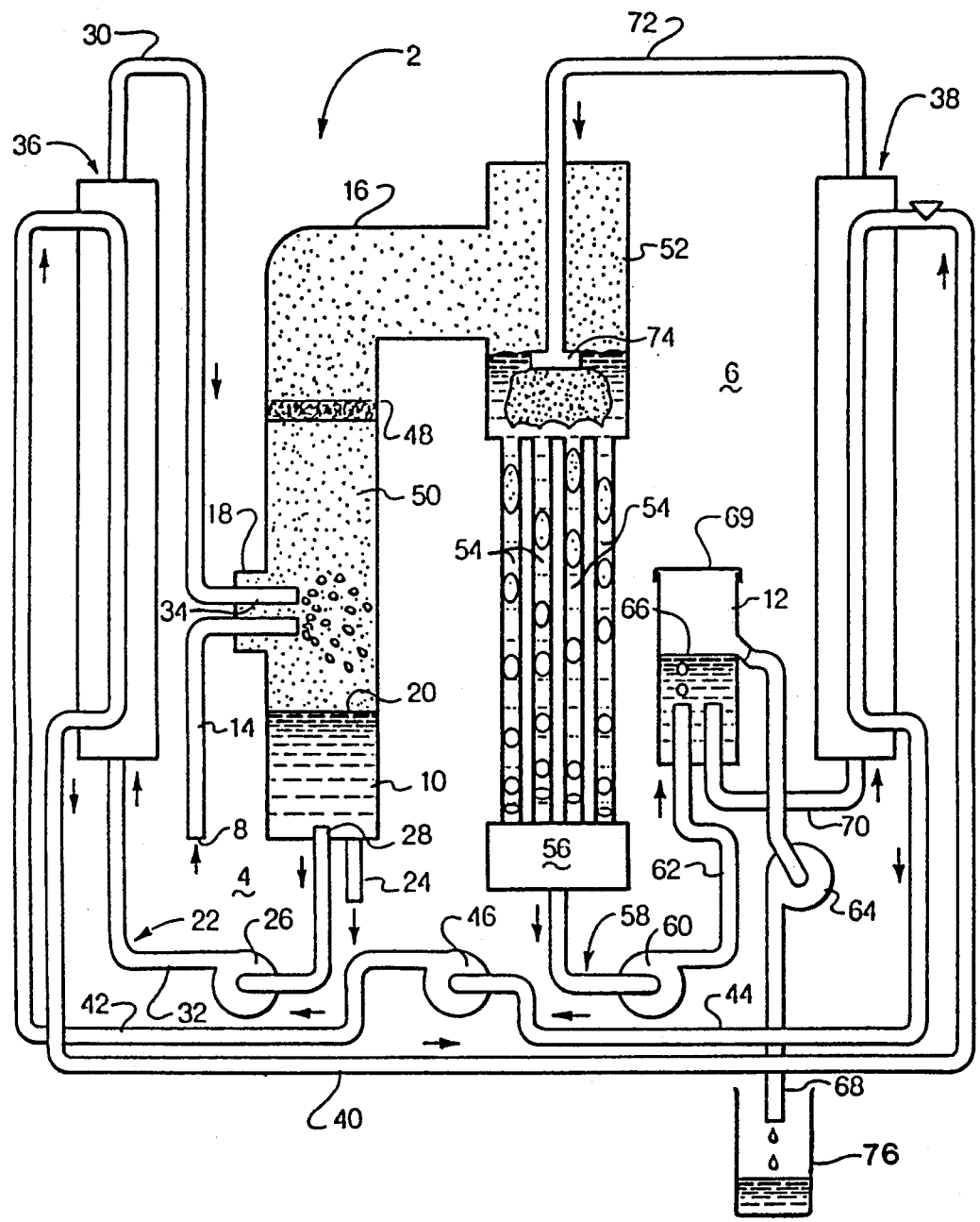

VACUUM DISTILLATION APPARATUS FOR REMOVAL OF VOLATILE IMPURITIES FROM LIQUIDS

This is a continuation of copending application Ser. No. 07/655,297, filed on Feb. 14, 1991, abandoned, which is a continuation of application Ser. No. 07/532,951 filed on Jun. 4, 1990, abandoned, which is a continuation of application Ser. No. 07/416,960, filed on Oct. 14, 1989, abandoned, which is a continuation of application Ser. No. 07/295,059 filed on Jan. 6, 1989 abandoned.

TECHNICAL FIELD

This invention relates to the field of vacuum distillation systems. Specifically, it concerns the removal of volatile impurities from liquids distilled in certain types of low temperature vacuum distillation systems.

BACKGROUND OF THE INVENTION

Low temperature vacuum distillation systems have previously been described in which distillate of a liquid descends through small diameter tubes, trapping gaseous impurities, to thereby assist in pumping such impurities from the system. Vacuum distillation systems of this design thus use the liquid being distilled to assist in creating the vacuum by removing these gaseous impurities. Examples of such systems have been taught generally by U.S. Pat. No. 4,269,664, issued May 26, 1981, by U.S. Pat. No. 4,444,623, issued Apr. 24, 1984, and by U.S. Pat. No. 4,762,593, issued Aug. 9, 1988.

It has been found that it is preferable to use a plurality of small diameter tubes rather than a single conduit of equal cross section for a number of reasons. One is that it is easier for a liquid to entrain bubbles more efficiently by employing smaller tubes.

To further assist in the condensation of the distillate, prior to descending through the bubble tubes, a portion of cooled final purified distillate is recycled to the condensation chamber. However, when the vapor pressure of the contained impurity is higher than the vapor pressure of the desired pure distillate, the impurity tends to be continually absorbed and desorbed from the liquid as it cycles through the vacuum distillation system. Consequently, the impurity evades complete removal.

As noted in U.S. Pat. No. 4,269,664 and U.S. Pat. No. 4,444,623, if the liquid being distilled contains impurities having a vapor pressure near or higher than that of the desired pure distillate, these impurities vaporize, migrate, condense and reach the open final distillate collection vessel just as the desired pure distillate does. As a result, such volatile impurities are not removed by the system.

The volatile impurities are able to boil or vaporize at the system operating pressure along with the desirable distillate. The impurity descends along with the desired distillate through the bubble tubes to the reservoir at the base of the bubble tubes. There it remains in a gaseous state entrained in the desirable distillate until it enters the pump immediately downstream of the bubble tube reservoir and is pumped to the final distillate collection vessel. As the liquid distillate and the gaseous impurity pass through this pump, they are compressed, the pressure on the liquids increases, and the gaseous impurity either liquifies or redissolves into the liquid distillate.

Since only gasses can be removed from the distillate at the final collection vessel, any impurities which have either re-liquified or become dissolved in the distillate cannot be removed. As the liquid mixture of desired condensed distillate and undesired impurity are cycled from the open final distillate collection vessel to reenter the vacuum distillation system, the pressure on the liquid drops and the impurity is once again able to re-vaporize. The gaseous impurity is thus continually absorbed and desorbed by the desirable distillate and is unable to be effectively vacated from the system.

The continual presence of this gaseous impurity prevents the pressure in the distillation system from reaching a desired low value. It also prevents the distillate from being purified of this volatile impurity.

SUMMARY OF THE INVENTION

The present invention is an improvement over previous vacuum distillation systems capable of removing volatile impurities from distillate. The improvement involves enclosing a final distillate collection vessel and creating a partial vacuum above the liquid level therein by employing of a vacuum pump. The partial vacuum created by this pump above the liquid level within the final collection vessel is sufficiently large to ensure the vaporization of the volatile impurity, yet small enough to permit the desired distillate to remain as a condensed liquid. Thus, the gaseous impurity is prevented from redissolving into the condensed distillate and can be pumped from the system.

The pump may transfer a quantity of the condensed distillate from the final distillation collection vessel along with the impurity if the vapor pressures of the impurity and the desired distillate are very close to each other. Depending on the identities of the desired product and the impurity and their relative vapor pressures, the vacuum created in the final distillate collection vessel may be very small (for example, nearly atmospheric pressure) to about the vapor pressure of the desirable distillate.

By using the present invention, the temperature differential between the warm vaporizing portion of the system and the cool condensing portion can be substantially decreased. The warm vaporizing portion of the system must only be cooled enough to ensure that the desired distillate remains in the liquid state under the vacuum created in the closed final distillate collection vessel.

BRIEF DESCRIPTION OF THE DRAWING

FIG. 1 is a schematic view of a low temperature vacuum distillation system embodying the present invention.

DETAILED DESCRIPTION OF THE INVENTION

As shown in the drawing, a preferred distillation system 2 according to the present invention generally comprises warm side evaporation apparatus 4 and cool side condensation apparatus 6. During operation, distillation system 2 receives raw liquid through raw liquid inlet 8 to be vaporized in a boiling chamber 10 under reduced pressure. The vapor or gas that is produced in boiling chamber 10 is directed to condensation apparatus 6 for cooling and condensation. A final distillate product is delivered to a distillate collection vessel 12.

The phrase "raw liquid", as used herein, refers to a fluid mixture from which a pure distillate is desired. The raw liquid to be distilled in the apparatus according to the present invention contains an impurity having a vapor pressure higher than the vapor pressure of the final desired pure distillate. "Spent liquid" refers to the fluid mixture residue in boiling chamber 10 that has been heated yet remains within boiling chamber 10.

Evaporation apparatus 4 includes boiling chamber 10, means 14 for supplying raw liquid to boiling chamber 10, and a connecting conduit 16 for directing vapors from boiling chamber 10 to condensation apparatus 6. Preferably, chamber 10 is vertically oriented with an extending sidearm 18, located generally above liquid level 20, for receiving raw liquid.

Flow control means (not shown) may, if desired, be incorporated into liquid supply means 14 to govern the flow of raw liquid to boiling chamber 10. Suitable flow control means have been described in U.S. Pat. No. 4,269,664 and U.S. Pat. No. 4,444,623, the disclosures of which are incorporated herein by reference.

Liquid supply means 14 may also include means 22 for circulating and heating raw and spent liquid from the lower portion of boiling chamber 10 and returning the liquid and any entrained vapor or gas back to boiling chamber 10, and a liquid outlet means 24, which may be valved for discharging raw and spent liquid from boiling chamber 10.

Circulating and heating means 22 preferably includes a pump 26 with an entrance port 28 in flow communication with the lower portion of boiling chamber 10. Preferably, as shown, entrance port 28 may be slightly elevated above the bottom of boiling chamber 10 to prevent any accumulated solid residue or debris from clogging or occluding entrance port 28, pump 26 and means 22.

Circulating and heating means 22 further includes a circulating raw liquid conduit 30 connected to pump 26, at one end 32, and, at another end 34, connected to sidearm 18 of boiling chamber 10. A heat exchanger heating portion 36, operatively coupled to conduit 30, is further provided for heating raw circulated liquid that is pumped from boiling chamber 10 through conduit 30.

The heating portion 36 of the evaporation apparatus 4, as illustrated in FIG. 1, is operatively connected to the heat exchanger cooling portion 38 of the condensation apparatus 6 by means of fluid flow lines 40, 42, and 44 and heat pump 46. Heating portion 36 may be heated by any source of low grade heat such as a flat plate solar collector or by an industrial process. The heated raw liquid, and any resulting vapor or gas, is returned to boiling chamber 10.

To prevent an air blockage at pump 26, entrance port 28 to pump 26 is completely flooded with liquid to prevent air or other noncondensed gas from entering pump 26. In addition, no control valves or other restrictions are intended to be used in the line except for the internal surface friction of the line itself. A gear pump is well suited to function as pump 26.

Liquid outlet means 24 preferably leads to further liquid flow lines which lead into a drain. A pump and check valve (not shown) may be incorporated into the flow lines of liquid outlet means 24 prior to the drain. If used, the pump acts to slowly pump spent liquid from boiling chamber 10, and the valve prevents drained liquid from backing up into boiling chamber 10 when the distillation apparatus is not in operation.

A T-vent (not shown) may also be incorporated into the flow lines of the liquid outlet means 24 to prevent the liquid in boiling chamber 10 from draining when distillation apparatus 2 is not operating. Pumping of liquid from boiling chamber 10 through the described liquid outlet means 24 prevents a buildup of salts and other contaminants in boiling chamber 10.

Means (not shown) for maintaining the liquid level in boiling chamber 10 at a predetermined level 20 may also be included. Suitable means for maintaining the predetermined liquid level 20 have been described in U.S. Pat. No. 4,269,664 and U.S. Pat. No. 4,444,623.

A demisting spray filter 48 may be positioned in the upper region of column 50 to entrap droplets of vaporized raw liquid, separating any entrained particulate impurities. The vapor or gas then continues through connecting conduit 16 to condensation apparatus 6.

Connecting conduit 16 directs the vapor or gas to a closed condensation chamber 52 located generally higher than boiling chamber 10. In chamber 52, the vapor or gas is received, cooled and condensed to a distillate. Column 50, connecting conduit 16, and condensation chamber 52 are in vacuum-tight fluid flow communication with boiling chamber 10.

Connected in vacuum-tight fluid flow communication with the lower portion of condensation chamber 52 is at least one bubble tube 54. The number, length and diameter of bubble tubes 54 are determined by the amount of distillate to be produced and the equilibrium diameter of bubbles traveling within bubble tubes. These features are further described in U.S. Pat. Nos. 4,269,664 and 4,444,623.

Bubble tubes 54 carry vapor or gas, in the form of bubbles, and distillate from condensation chamber 52 to closed collection chamber 56. Where the impurity or impurities to be removed have a vapor pressure near or higher than that of the desired distillate, these vapor or gas bubbles represent the impurity to be removed in forming the final desired distillate. Closed collection chamber 56 is also in vacuum-tight fluid flow communication with bubble tubes 54.

Leading from closed collection chamber 56 is transfer means 58, which conveys a mixture of vapor or gas and distillate from collection chamber 56 to closed final distillate container 12 via pump 60 and conduit 62, in continuous vacuum-tight fluid flow communication throughout. Closed final distillate container 12 is preferably located at a height slightly below that of condensation chamber 52.

Pump 64 is illustrated as being connected to closed container 12 so as to create a partial vacuum above the liquid level 66 in closed container 12. Pump 64, preferably a gear pump, is capable of handling liquid, gas or vapor, and mixtures thereof. When the impurities to be separated have a vapor pressure higher that of the final desired pure distillate, the partial vacuum created above the liquid level 66 in closed container 12 by pump 64 must be sufficiently high to allow the impurity to become or remain in the gaseous state, while also being sufficiently low to allow the desired pure distillate to remain in the liquid state. When the partial vacuum created within container 12 by pump 64 is chosen to be within these levels, the gas or vapor impurity is maintained in the gaseous state and can then be pumped from the system by pump 64 to vent/output line 68. This prevents the gaseous impurity from becoming redissolved in the desirable pure distillate now collected within closed container 12. Again, as previously pointed out, pump 64 pulls both vapors and liquids from container 12.

While only one pump 64 is shown for venting both the volatile impurity in the gaseous state and pumping desired pure distillate in the liquid state, it will be understood that two pumps could be employed. One could function to vent the volatile impurity, and a second could function to pump the distillate to a final receptacle 76. Even when two pumps are employed, however, container 12 will be sealed in order to maintain the partial vacuum created therein.

A portion of pure distillate from container 12 can be made to flow through conduit 70 to be introduced, by conduit 72, as cooled distillate in condensation chamber 52, through manifold distributor 74. The distillate functions to help condense gas or vapor from boiling chamber 10.

In certain embodiments, container 12 could be eliminated. In such embodiments, pump 64 would apply a partial vacuum to closed collection chamber 56 in order to facilitate venting of the gaseous volatile impurities. Pump 60 would pump distillate received in closed collection chamber 56 to conduit 70 to be introduced, by conduit 72, into condensation chamber 52, through manifold distributor 74.

Cooling portion 38, operatively coupled to conduit 70, can further be provided for cooling condensed distillate that is pumped from container 12 to condensation chamber 52. Cooling portion 38 may be coupled to heating portion 36 by means of fluid flow lines 40, 42 and 44 and pump 46. Alternatively, cooling portion 38 may be cooled by water from any suitable source, such as an open pond.

OPERATION

Prior to initiating operation of distillation apparatus 2, the level of pure distilled liquid in bubble tubes 54 should be the same as desired liquid level 66 in container 12. This can suitably be done by releasing the pressure on and opening container 12 by removing sealable lid 69. Pure distilled liquid can then be poured into container 12, to run backward through pump 60 and up into bubble tubes 54, until the liquid level in bubble tubes 54 is the same as liquid level 66 in container 12. Lid 69 is then closed and sealed.

Raw liquid is introduced into boiling chamber 10 through means 14 from a source of raw liquid, to fill chamber 10 to liquid level 20. Any appropriate controlling device known in the prior art could be employed. The raw liquid contains an impurity with a higher vapor pressure than the vapor pressure of the desired pure distillate.

To begin operation of distillation apparatus 2, pumps 26, 60 and 64 are activated to begin circulation of gas or vapor and liquid. If heating portion 36 is connected to cooling portion 38 by means of pump 46, as illustrated in FIG. 2, then pump 46 is also activated to begin circulation of heat exchange fluid.

Vapor or gas generated by heating and circulating means 22, in combination with boiling chamber 10, is directed from boiling chamber 10 upward through column 50, past demisting spray filter 48, into connecting conduit 16 and then to condensation chamber 52. In condensation chamber 52, the vapor or gas condenses on the cooled distillate introduced through distributor 74 that is traveling along the walls of condensation chamber 52. Any vapor or gas that is trapped in the distillate is carried through bubble tubes 54 to collection chamber 56.

From collection chamber 56, pump 60 removes a mixture containing liquid with entrapped gaseous impurities through line 62 to final distillate collection chamber 12. The partial vacuum created by pump 64 within chamber 12 is selected to ensure that the entrapped impurity, having a vapor pressure higher than the gaseous pressure of the pure distillate also in chamber 12, is maintained or rendered in the vaporous state.

The gaseous impurity is pumped from chamber 12 by pump 64 to be vented from the distillation system at vent 68. Depending on the vapor pressures of the impurity and that of the desired pure distillate, the pressure will be between about atmospheric pressure and the vapor pressure of the desired pure distillate.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A vacuum distillation apparatus for purifying a raw liquid, said raw liquid having an impurity of higher vapor pressure than that of a desired distillate component entrained therein, comprising:
   (a) evaporation apparatus including a boiling chamber, means for supplying raw liquid to the boiling chamber, and means for conveying vapor or gas from the boiling chamber; and
   (b) condensation apparatus including:
      (i) a closed condensation chamber generally higher than the boiling chamber and communicating with the conveying means to receive, cool, and condense the vapor or gas to a liquid;
      (ii) a first closed collection chamber generally below the condensation chamber;
      (iii) at least one bubble tube sealingly interconnecting a lower portion of the condensation chamber and an upper portion of the first collection chamber and extending downward into the first collection chamber;
      (iv) a second closed collection chamber disposed at a height above a height of said first closed collection chamber;
      (v) first transfer means, sealingly engaged and extending, at one end thereof, into the first collection chamber, and connected, at an opposite end thereof, to said second collection chamber, for conveying a mixture of vapor or gas and distillate component from the first collection chamber to the second collection chamber;
      (vi) means for creating a partial vacuum above a liquid level in said second closed collection chamber sufficient to cause the impurity to become or remain in a gaseous state, yet insufficient to cause the distillate component to change to a gaseous state; and
      (vii) means for releasing and venting the impurity.

2. The distillation apparatus according to claim 1, wherein said first transfer means includes means for pumping a mixture of gas or vapor and distillate from the first collection chamber to the second collection chamber.

3. The distillation apparatus according to claim 2, wherein said pumping means is a gear pump.

4. The distillation apparatus according to claim 1, wherein said means for creating a partial vacuum in the second collection chamber is a gear pump.

5. The distillation apparatus according to claim 4, wherein the pressure of the partial vacuum is between about atmospheric pressure to about the vapor pressure of said distillate component.

6. The distillation apparatus of claim 1 further comprising second transfer means, sealingly engaged, at one end thereof, with the bottom of said second collection chamber, and terminating, at an opposite end thereof, in said condensation chamber; and wherein said second transfer means further comprises a heat exchanger for cooling distillate passing through said second transfer means.

7. The distillation apparatus according to claim 6, further comprising a branched distillate distributor carried by said second transfer means at said end terminating in said condensation chamber, said distributor applying cooled distillate to the walls of said condensation chamber such that a large surface area is provided for condensation of the vapor or gas from said boiling chamber.

8. The distillation apparatus according to claim 1, wherein said means for conveying vapor or gas from said boiling chamber includes a filter for removing particulate from vapor or gas passing through said conveying means.

* * * * *